July 3, 1962 — F. W. KNOWLES — 3,042,095
SELF-LOCKING TIRE CHAIN
Filed Oct. 3, 1960 — 4 Sheets-Sheet 1
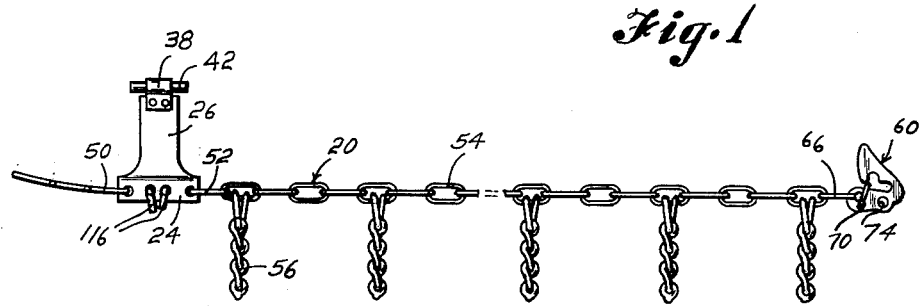
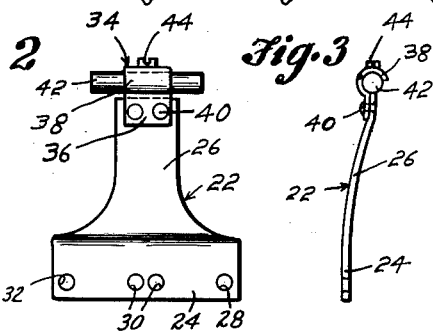
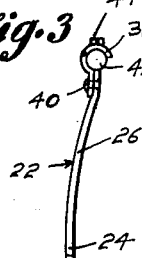
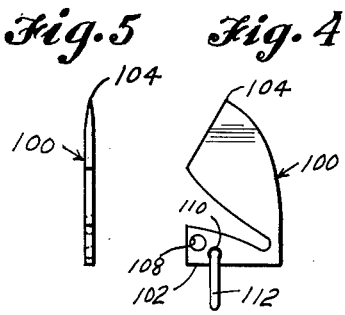
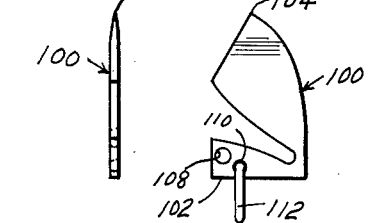
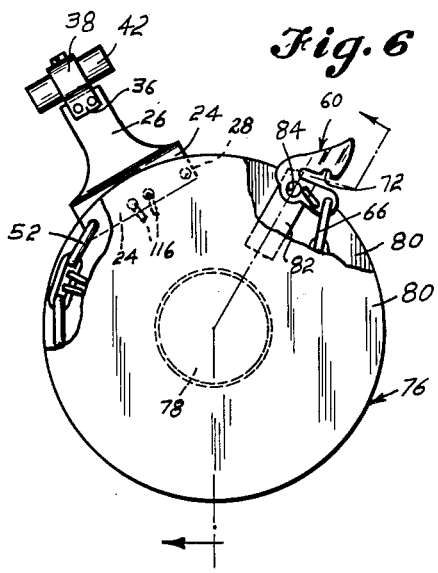
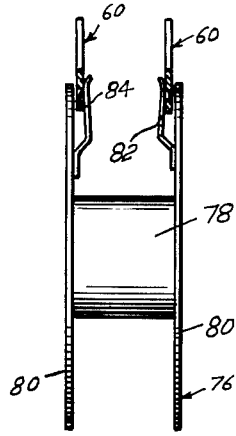
INVENTOR.
Frank W. Knowles
BY T W Secrest July 3, 1962 F. W. KNOWLES 3,042,095
SELF-LOCKING TIRE CHAIN
Filed Oct. 3, 1960 4 Sheets-Sheet 2

INVENTOR.
Frank W. Knowles
BY TW Secrest

July 3, 1962 F. W. KNOWLES 3,042,095
SELF-LOCKING TIRE CHAIN
Filed Oct. 3, 1960 4 Sheets-Sheet 3

INVENTOR.
Frank W. Knowles
BY
TW Secrest

July 3, 1962 F. W. KNOWLES 3,042,095
SELF-LOCKING TIRE CHAIN
Filed Oct. 3, 1960 4 Sheets-Sheet 4

INVENTOR.
Frank W. Knowles
BY
7W Secrest

United States Patent Office 3,042,095
Patented July 3, 1962

3,042,095
SELF-LOCKING TIRE CHAIN
Frank W. Knowles, 2921 Alaska St., Seattle 8, Wash.
Filed Oct. 3, 1960, Ser. No. 59,912
6 Claims. (Cl. 152—213)

This invention is a self-locking tire chain and which chain can be attached to a tire by applying the base members to the rim and driving the car so as to have the chain encompass the tire. The chain automatically locks itself to a base member or an element attached to the base member.

The application of tire chains to automobile tires and truck tires to overcome the effects of snow and ice on the road is usually one of annoyance and frustration. More particularly, when the snow is so deep as to necessitate the application of the chain to the tire while on the road, a person will normally lay out the chain in back of the rear wheel and back the car over the chain and hope that it is in the right position to secure the chain to the circumference of the tire or to the perimeter of the tire. Or, a person may jack up the rear wheel of the car and apply the chain in that manner. And, finally, if the road or street is impassable, the person may drive the car to a gas station and have the same placed on a hydraulic lift so that the chain can be attached by an attendant. In any of these instances it is usually annoying and time consuming to apply tire chains.

With this experience of having had to apply tire chains, I have invented a tire chain which can be maintained in a small compact holder until needed and which can then be attached to the rim of the wheel. Upon driving the car forward or backward as desired, the chain is taken out of the holder and automatically wrapped around the perimeter of the tire. Upon encompassing the tire the chain automatically locks itself so as to be securely attached to the tire. The holder, of course, is removed or kicked off the chain. In this manner a person can very easily attach the tire chain to the tire in a matter of a minute or two without the necessity of first laying out the chain and backing over it or raising the car so as to apply the chain.

Accordingly, I have invented a tire chain which can be easily and quickly applied to the tire by both men and women without soiling their clothes or without necessitating getting underneath the car so as to rub their clothes on the road or pavement; which tire chain can be easily removed from the tire by unhooking a catch attached to a base member and driving the car forward so as to let the chain fall off the tire; which tire chain is inexpensive to manufacture and sell as it comprises only a few inexpensive and economical parts over the presently used tire chains; and, which chain when not in use can be stored in the small holder so as to require only a small storage space.

These and other advantages will be more particularly brought out upon reference to the accompanying drawings, detailed specification of the tire chain and appended claims to the specification.

In the drawings:

FIGURE 1 is a fragmentary view of the chain in a stretched configuration and shows the main components.

FIGURE 2 is a side view of the base member and illustrates the magnet on one end of the base.

FIGURE 3 is an edge view of the base member.

FIGURE 4 is a side view of a catch used in the tire chain.

FIGURE 5 is an end view of the catch used in the tire chain.

FIGURE 6 is a side view of the tire chain in the rolled-up condition on the holder and illustrates the clamping means for releasably holding the catch on the holder and also illustrates the base member.

FIGURE 7 is an end view of the holder with the catch in position in the clamps on the side of the holder, but this figure does not show the tire chain wrapped on the hub of the holder.

Figure 11:
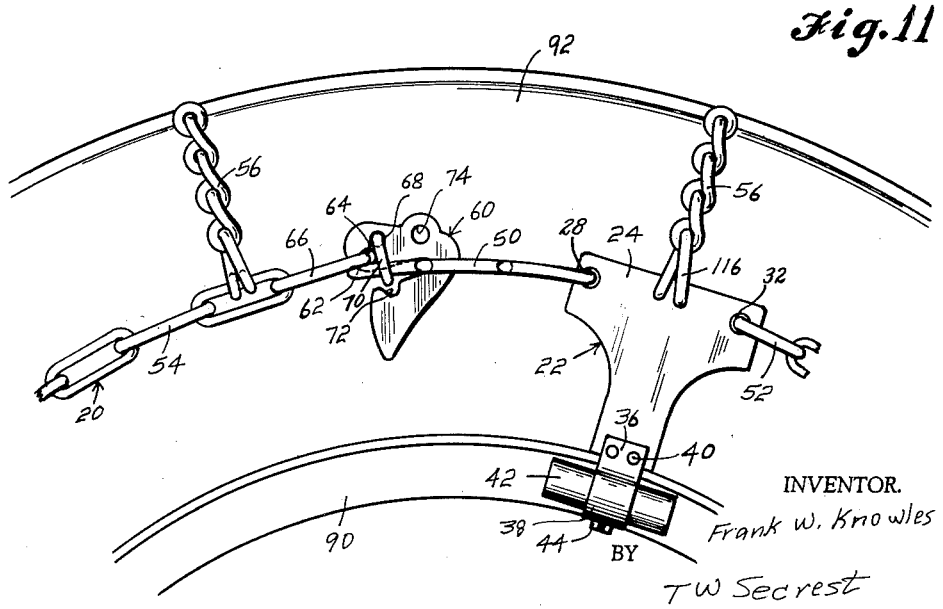
Figure 12:
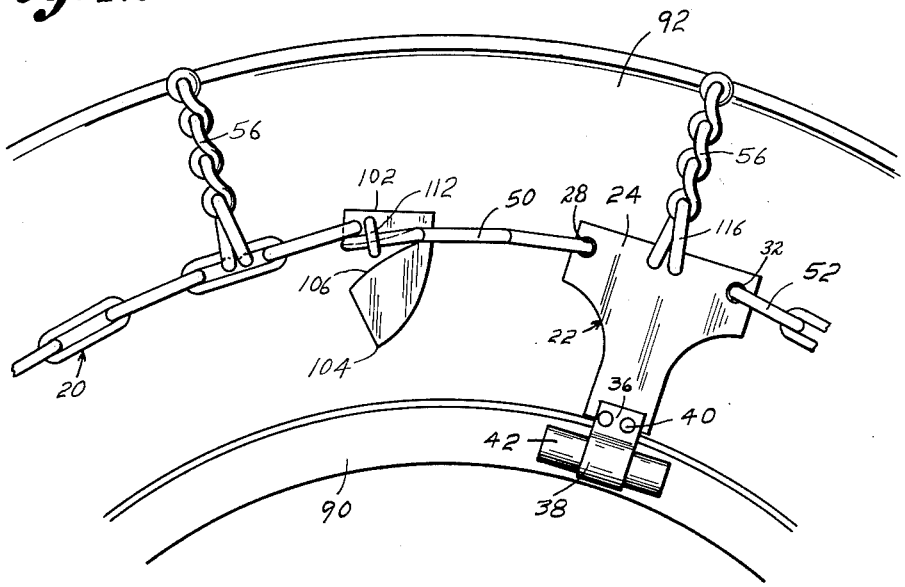

FIGURE 11, on an enlarged scale, shows the tire chain mounted on a tire with the base member attached to the rim of the wheel by means of a magnet and the catch passing through the firmly positioned chain link on the base member; and, FIGURE 12 is a fragmentary view very similar to FIGURE 11 except a modification of the catch is illustrated.

Referring to the drawings, it is seen that the invention comprises a tire chain 20. This chain has a base member 22. The base member comprises a flat base plate 24 and a curving arm 26. In the base plate 24 is a series of drilled passageways 28, 30 and 32. The passageways or holes 30 are in the center and near the edge of the base plate while the passageways or holes 28 and 32 are near opposed sides of the base plate. At the end of the curving arm 26 there is attached a clamping finger 34. This clamping finger 34 has a flat base 36 and a curving finger 38. The flat base 36 is attached to the end of the curving arm 26 by means of rivets 40. The finger 38 holds a magnet 42. To assist in holding the magnet 42 there is provided a screw 44 along the upper surface of the finger.

In the hole 28 there is positioned rigidly a link 50. The link may be rigidly positioned by welding it in place. Actually, in FIGURES 1, 8, 9, 10, 11 and 12, the link 50 is a series of three rigid links. The link 50 may project outwardly at a right angle with respect to the edge of the base plate or curved slightly inwardly with respect to the magnet 42.

In the hole 32 there is movably positioned a link 52. This link 52 connects with a series 54 of links which run around the side wall of the tire when in an assembled position. The series 54 of links is connected by a number of lateral sets 56 which run over the tread of the tire to another series of links 54 which run around the tire on the opposite side wall of the tire. The circumferential set of links 54 and the lateral set of links 56 are the same as commonly used in tire chains and in this respect do not differ from the ordinary tire chains.

On the other end of the circumferential set of links 54, i.e., that end opposed to the end attached to the base member 22, there is a catch 60. This catch 60 is a flat metal and is of a general triangular configuration. In the base there is a slot 62 which runs to almost the apex of the trangle but, naturally, not to the apex. Near the base there is a drilled hole or passageway 64. Positioned in this passageway 64 is a link 66 which connects with the circumferential set of links 54. Above the drilled hole 64 there is another hole 68. In the hole 68 is a keeper 70. Actually, all the keeper is is a U-shaped piece of wire wherein the legs hang down along the side of the flat surfaces of the base of the catch 60, and the U part of the keeper is in the hole 68. It is to be realized that the keeper 70 is free to rotate in the hole 68, and that the catch 60 is free to rotate on the U-linkage 66. The keeper 70 is free to rotate toward the base member 22, but the link 66 prevents the complete rotation away from 22.

In the slot 62, and on that side of the slot opposed to the side wherein there are the holes 64 and 68, there is a recess 72. The slot 72 is to pick up the link 50 when the wheel is reversed and to prevent the load coming on the keeper 70.

In the catch 60, and on the same side of the slot as the holes 64 and 68, there is a third hole 74.

The chain 20 may be wound on a spool 76. The spool 76 comprises a hub 78 and two spaced-apart circular disks 80 mounted on opposed sides of the hub 78. On the inner surface of each disk 80 there is tack welded a spring clamp 82. This clamp 82 is tack welded near the hub and runs upwardly so as to extend slightly beyond the periphery of the disk 80. On the inner surface of each spring clamp 82 there is a nipple 84.

The chain 20 is wound on the spool 76 by attaching each of the catches 20 in the spring clamp 82 wtih the nipple 84 projecting into the hole 74 of the catch 60. Turning to FIGURE 6 it is seen that the chain is wound in a clockwise direction on the spool 76.

The chain can be mounted on the tire by placing the magnet 42 of the base member 22 near the outside of the rim 90 on which tire 92 is mounted. The base member 22 is of sufficient length to run from the rim 90 to substantially the mid-section of the tire 92. As is well known, the tire 92 has its widest width at the mid-section. The rim of the wheel at 90 is recessed to form a groove and the magnet 42 co-fits to it to agree with the recess 90 of the rim. In placing the base member on the rim and the tire, it is to be pointed out that the link 50, which is rigidly attached to the base member 22, is pointed in the direction of rotation or the leading edge of the base member. Therefore, the trailing edge of the base member 22 is attached to the chain 54.

Figure 8:
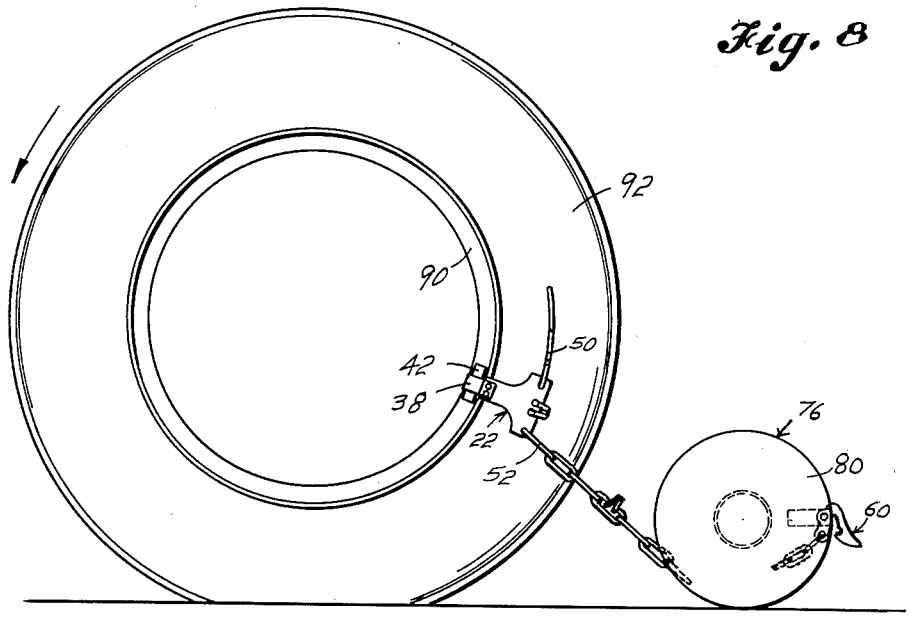
FIGURE 8 is a schematic view illustrating the attaching of the base member to the rim of the wheel and with the holder on the ground behind the tire.
Figure 9:
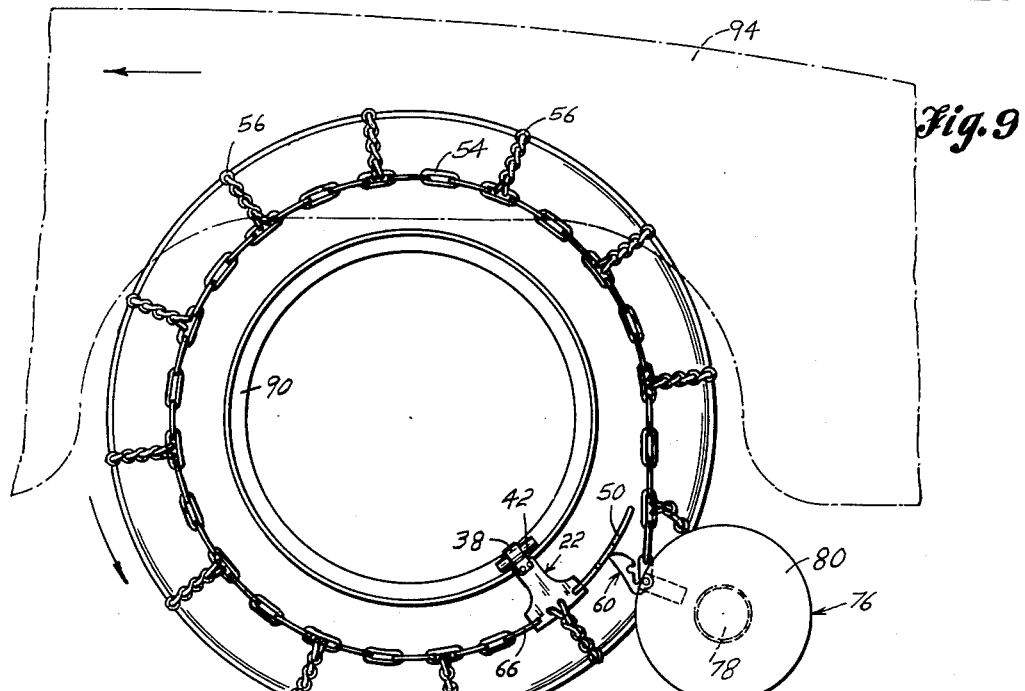
FIGURE 9 is a schematic view illustrating the tire chain on the tire but before the catch has passed through the hook to lock the tire chain on the tire, and illustrates the magnet on the rim of the wheel with the chain substantially unwound from the holder and with the catch entering the link attached to the base member.
Figure 10:
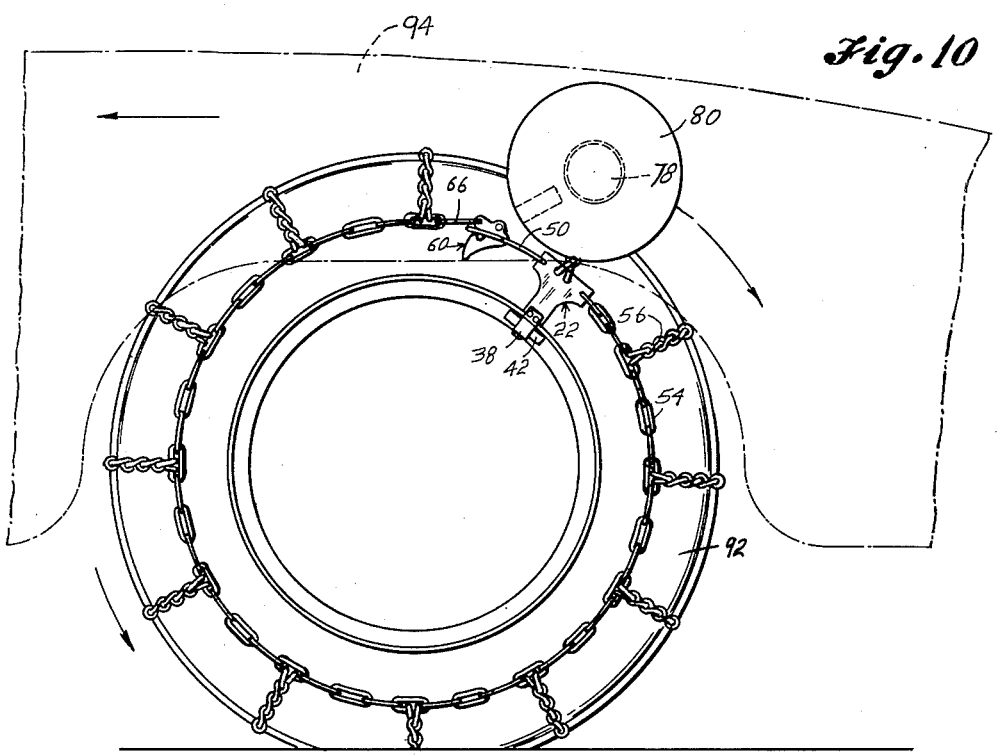
FIGURE 10 illustrates the tire chain on the tire with the holder just knocked from the catch on the tire chain, said holder being knocked off by hitting the cowling around the wheel well in an automobile or truck.

With the revolving of the wheel, see FIGURES 8, 9 and 10, in a counterclockwise direction the chain is unwound from the spool 76. Upon unwinding from the spool, the circumferential set of links 54 becomes placed on the tire near the mid-section of the side wall, and the lateral set of links 56 run around the tread of the tire to another circumferential set of links 54 on the other side wall of the tire. Upon the complete unwinding of the chain 20 from the spool 76, see FIGURE 9, the catch 60 is pointed in a direction to pass through the rigid link 54 on the base member 22. It is to be realized that the width of the metal used in the catch 50 is narrower than the opening in the link 50 so that the catch in this regard can easily pass through the link. Also, the leading edge of the catch between the side wall of the catch in the slot is of sufficiently small dimension, as compared with the opening of the link to pass through the link. In FIGURE 9 it is seen that the catch 60 is in a position to pass through the opening in the link 50.

Turning now to FIGURE 10, it is seen that the wheel has rotated a sufficient distance so that the spool 76 hits the cowling 94 surrounding or encompassing the wheel of the automobile or truck. By hitting the cowling 94 the spool 76 is knocked free or jarred loose from the catch 60. The hitting of the cowling 90 or the fender pushes the catch 60 inward to unite with the link 50. Or, the contact and completion of uniting the catch 60 and the link 50 can be made by the operator with his foot against the spool 76 with the car stopped and with the chain unwound from the spool.

Referring now to FIGURE 11, it is seen that the keeper 70 will also fall down over the sides of the link 50 and imprison or lock it in position in the slot 62. In order to do this, the distance between the legs of the keeper 70 must be greater than the outside dimension of the link 50. If there should be any slackness or looseness in the chain 20 while on the tire, the keeper 70 will prevent the catch 60 from becoming completely disengaged from the link 50 so that the tire chain will come off the tire.

In FIGURES 4, 5 and 12 there is illustrated another catch 100. This catch may be used in place of the catch 60. It comprises a flat piece of stock having a straight base 102 which rises into an apex 104. In one side there is a slot 106 which has a wide mouth and narrows into a narrower throat. On that side of the slot near the base 102 there is a drilled passageway 108 for connecting with the link 66 of the tire chain 20.

Also on that side of the slot near the base 102 there is a drilled passageway 110 for receiving a keeper 112. This keeper is similar to the keeper 70 in that it is of a U-shaped configuration having legs and a U. The U is in the passageway 110. Again, the dimensions of the catch 100 are such as to allow the catch to pass through the opening in the link 50. Turning to FIGURE 5 it is seen that the pointed edge 104 of the catch is tapered so as to present a leading edge or a relatively sharp guide edge for passing through the opening in the slot 50.

In FIGURE 12 it is seen that in the assembled state on the tire that the link 50 is in the slot 106 and with the catch 100 near the top of the tire, when the same is rotating, the keeper 112 is hanging down along the sides of the catch 100. The distance between the legs of the keeper 112 is, again, greater than the outside distance or outside dimension of the link 50 so that the keeper 112 can fall down outside of the link 50 and thereby prevent the link from falling out of the slot 106.

In the base plate 24 of the base member 22 there are two holes 30—30 for receiving a link 116 which attaches to a lateral set of links 56. The lateral set of links 56 pass over the tread of the tire and connect with another link 116 which is attached to the other base member 22 on the other side of the tire.

The tire chain with the catch 100 on one end can be mounted on the spool 76 in a manner similar to the mounting of the tire chain with the catch 60 on one end. More particularly, the nipples 84 can be placed in the inner end or the throat end of the slot 106 and thereby hold the catch 100 firmly, and yet yieldingly, in position on the spool sides 80 of the keeper 76.

It is to be realized that in this tire chain there may be employed different types of catches or different types of magnets; or the link 50, instead of being a link, may be a hook or the like. For example, the base member 22 may have attaching means other than the magnet 42. The attaching means may be a spring attached to the end of the curving arm 26 with a sharp tool steel point on its free end. In use the steel point is reversed into the wheel rim. By biting into the wheel rim, the steel point positions the base member 22 with respect to the rim and the tire. Nevertheless, it is intended that the language of the specification be broad enough and interpreted sufficiently broadly to cover various minor modifications and equivalents.

Having presented my specification, what I claim is:
1. A tire chain, said chain comprising two base members each base member having an attaching means on its inner end for attaching the base member to a rim on which a tire is mounted, said base members being attached to said rim on opposed sides, each of said base members being of sufficient length to extend from the rim to approximately the middle of the side wall of the tire, said chain comprising two sets of links, the two sets of links running circumferentially around the tire on opposed sides, said two sets being connected by lateral sets of links, each circumferential set of links being flexibly connected at a first end to the base member, an outwardly directed link rigidly attached to each base member, a hook on a second end of each circumferential set of chains, said hook having a slot for cofitting with said outwardly directed link, a holder for said tire chain, said holder having means for releasably holding the hook in a position to cofit with said catch when the tire chain is on the tire and the tire is rotating, said outwardly directed link being directed in a direction opposed to the direction of said circumferential set of links at the first end of the base member so as to receive said hook after the circumferential set of links have circled the tire.

2. A tire chain, said chain comprising two base members, each base member having a magnet on its inner end for attaching the base member to a rim on which a tire is mounted, said base members being attached to said rim on opposed sides of the tire, each of said base members being of sufficient length to extend from the rim to approximately the middle of the side wall of the tire, said base curving outwardly from the magnet to conform to the configuration of the tire, said chain comprising two sets of links, the two sets of links running circumferentially around the tire on opposed sides, said two sets being connected by lateral sets of links, each circumferential set of links being movably connected at a first end to the base member, an outwardly directed link being attached to each base member, said link being fixedly attached to the base member, a hook on a second end of each circumferential set, said outwardly directed link being directed in a direction opposed to the direction of said circumferential set of links at the first end of the base member so as to receive said hook after the circumferential set of links have circled the tire, said hook having a slot, said hook being of such a size and configuration as to pass through said link, in assembled relationship said hook passing part way through said link with the link in said slot and said slot having its open end directed toward the second end.

3. A tire chain, said chain comprising two base members, each base member having a magnet on its inner end for attaching the base member to a rim on which a tire is mounted, said base members being attached to said rim on opposed sides of the tire, each of said base members being of sufficient length to extend from the rim to approximately the middle of the side wall of the tire, said base curving outwardly from the magnet to conform to the configuration of the tire, said chain comprising two sets of links, the two sets of links running circumferentially around the tire on opposed sides, said two sets being connected by lateral sets of links, each circumferential set of links being movably connected at a first end to the base member, an outwardly directed link being attached to each base member, said link being fixedly attached to the base member, a hook on a second end of each circumferential set, said outwardly directed link being directed in a direction opposed to the direction of said circumferential set of links at the first end of the base member so as to receive said hook after the circumferential set of links have circled the tire, said hook having a slot, said hook being of such a size and configuration as to pass through said link, in assembled relationship said hook passing part way through said link with the link in said slot and said slot having its open end directed toward the second end, a holder for said tire chain, said holder comprising two spaced sides connected to a hub, a clamp in working relationship with each side, and said clamps releasably holding said hooks in a position to cofit with said catch when the tire chain is on the tire and the tire is rotating.

4. A tire chain, said chain comprising two base members, each base member having a magnet on its inner end for attaching the base member to a rim on which a tire is mounted, said base members being attached to said rim on opposed sides of the tire, each of said base members being of sufficient length to extend from the rim to approximately the middle of the side wall of the tire, said base curving outwardly from the magnet to conform to the configuration of the tire, said chain comprising two sets of links, the two sets of links running circumferentially around the tire on opposed sides, said two sets being connected by lateral sets of links, each circumferential set of links being movably connected at a first end to the base member, an outwardly directed link being attached to each base member, said link being fixedly attached to the base member, a hook on a second end of each circumferential set, said outward directed link being directed in a direction opposed to the direction of said circumferential set of links at the first end of the base member so as to receive said hook after the circumferential set of links have circled the tire, said hook having a slot, said hook being of such a size and configuration as to pass through said link, said slot on its outer surface having a recess to receive said link, a keeper for keeping said link in the slot, in assembled relationship said hook passing part way through said link with the link in said slot and said slot having its open end directed toward the second end.

5. A tire chain, said chain comprising two base members each base member having an attaching means on its inner end for attaching the base member to a rim on which a tire is mounted, said base members being attached to said rim on opposed sides, each of said base members being of sufficient length to extend from the rim to approximately the middle of the side wall of the tire, said chain comprising two sets of links running circumferentially around the tire on opposed sides, said two sets being connected by lateral sets of links, each circumferential set of links being flexibly connected at a first end to the base member, an outwardly directed link rigidly attached to each base member, a hook on a second end of each circumferential set of chains, said hook having a slot for cofitting with said outwardly directed link, a portable holder for said tire chain, said holder having means for releasably holding the hook in a position to cofit with said catch when the tire chain is on the tire and the tire is rotating, said holder being free of the tire and the vehicle of which the tire comprises a component, and said outwardly directed link being directed in a direction opposed to the direction of said circumferential set of links at the first end of the base member so as to receive said hook after the circumferential set of links have circled the tire.

6. A combination of a tire chain and a portable holder for the chain, said chain comprising two base members each base member having an attaching means on its inner end for attaching the base member to a rim on which a tire is mounted, said base members being attached to said rim on opposed sides, each of said base members being of sufficient length to extend from the rim to approximately the middle of the side wall of the tire, said chain comprising two sets of links, the two sets of links running circumferentially around the tire on opposed sides, said two sets being connected by lateral sets of links, each circumferential set of links being flexibly connected at a first end to the base member, an outwardly directed link rigidly attached to each base member, a hook on a second end of each circumferential set of chains, said hook having a slot for cofitting with said outwardly directed link, said holder having means for releasably holding the hook in a position to cofit with said catch when the tire chain is on the tire and the tire is rotating, said outwardly directed link being directed in a direction opposed to the direction of said circumferential set of links at the first end of the base member so as to receive said hook after the circumferential set of links have circled the tire, and said holder with the chain on the tire being free of the chain and the tire and the vehicle of which the tire is a component.

References Cited in the file of this patent

UNITED STATES PATENTS

| | | |
|---|---|---|
| 1,211,597 | Kress | Jan. 9, 1917 |
| 1,489,963 | Pearre | Apr. 8, 1924 |
| 2,395,013 | Reese | Feb. 19, 1946 |
| 2,608,231 | Johnson | Aug. 26, 1952 |
| 2,630,155 | Kandel | Mar. 3, 1953 |
| 2,815,060 | Hellman | Dec. 3, 1957 |